INVENTORS
JOHN W. HEBERT
PHILLIP G. LARUE
BY
ATTORNEYS

July 10, 1962  J. W. HEBERT ETAL  3,043,249
INCINERATORS

Original Filed March 24, 1958  3 Sheets-Sheet 2

INVENTORS
JOHN W. HEBERT
PHILLIP G. LARUE
BY
*Learman, Learman, & McCulloch*
ATTORNEYS

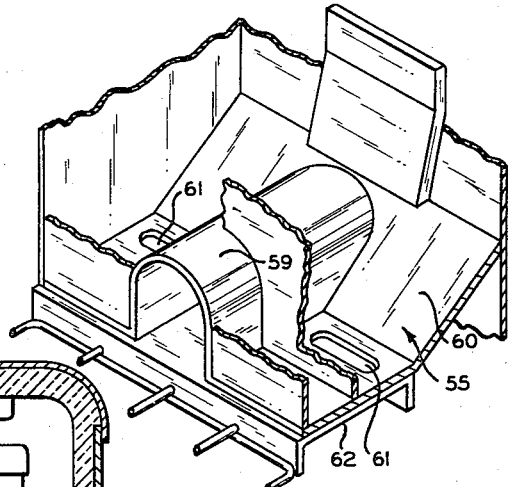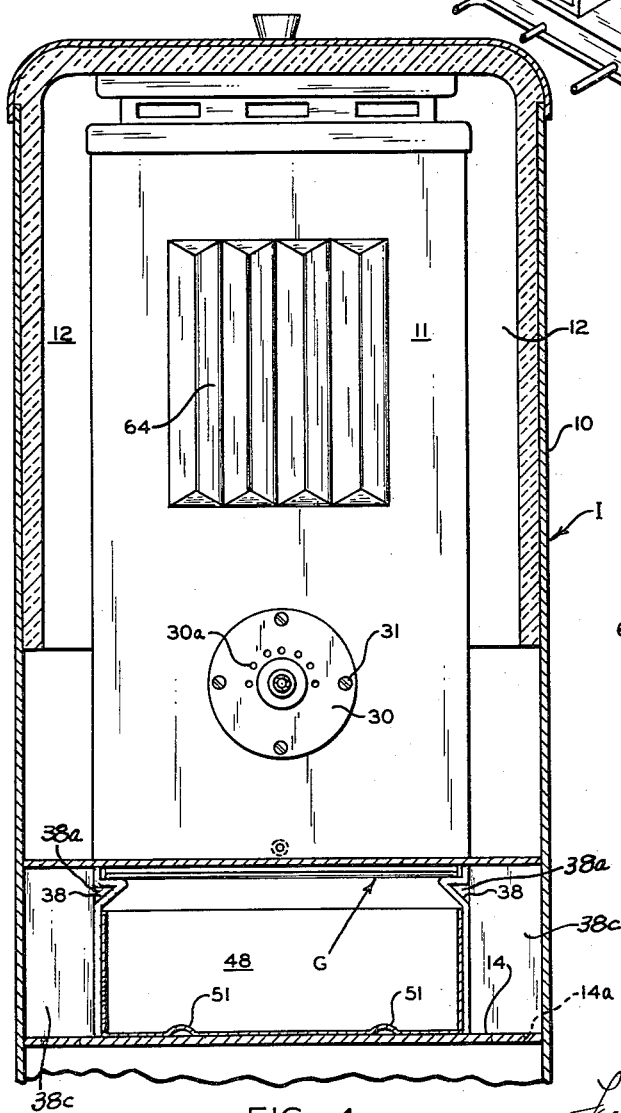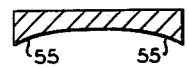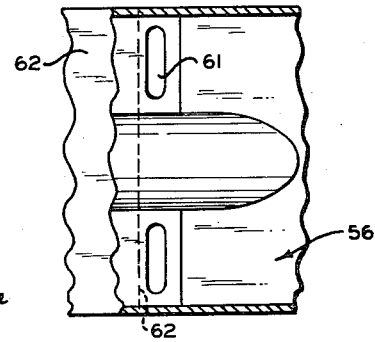

United States Patent Office 3,043,249
Patented July 10, 1962

3,043,249
INCINERATORS
John W. Hebert and Phillip G. La Rue, Saginaw, Mich., assignors to Calcinator Corporation, Bay City, Mich., a corporation of Michigan
Original application Mar. 24, 1958, Ser. No. 723,470. Divided and this application Dec. 7, 1959, Ser. No. 857,912
7 Claims. (Cl. 110—8)

This invention relates to incinerators for burning all forms of combustible refuse, trash, and garbage, and more particularly to incinerators which are designed to secondarily combust the off gases of incineration and to methods of incinerating off gases.

In the usual operation of domestic incinerators which burn refuse, trash, and garbage within a home or building, considerable volumes of smoke, odiferous fumes, and fly ash and other noncombustible particulate matter are given off as the by-products of combustion. Most of the incinerators sold today are not designed to secondarily combust these off products and the result is that the atmosphere in many populous areas, where a good many incinerators are used and where there is also considerable industry, is being fouled by the discharge of these products. Various incinerators have been proposed for secondarily combusting the off gases of incineration prior to releasing them to the atmosphere; however, these incinerators have not been more than about 50% effective and have not been widely adopted. Recently, the assignee of this application introduced an incinerator having catalytic oxidation elements located in the path of the off gases of incineration which satisfactorily consumed and filtered out virtually all of these undesirable by-products of incineration and had the approval of laboratory testing associations and the groups which set the standards for the industry. While these incinerating units which employed catalyst elements successfully destroyed off gases from all types of relatively wet and dry combustible waste including vegetable waste, meats, feathers, suets, slaughtered poultry, grain, large bones, wool, skins, hair, sawdust, rags, paper, wax cartons, and the like, it was found that the cost of the catalyst elements was quite high.

One of the principal objects of the present invention is to design an incinerator which is capable of successfully combusting the off gases of an equally large variety of products with a gas flame and does not require catalytic oxidation elements to provide a virtually complete combustion.

Another object of the invention is to provide an incineration unit of the type described which is of compact and efficient design and requires but a single burner having a torch-like flame which both burns the solids in a primary combustion chamber and combusts the off gases in a secondary combustion chamber.

A futher object of the invention is to provide an incinerator which is so designed that the flow of off gases is concentrated and virtually all of the gases are mixed with tongues of flame which effect a complete combustion of the combustible gases in the off gases and combustible particles entrained therein.

A further object of the invention is to provide an incineration unit of the type described in which the intermixed off gases and tongues of flame are formed into cyclones of gases spiraling about a nonturbulent center or eye which permits the intimate association of the tongues of flame with the expanding gases and assures a thorough combustion of combustible vapors in the gases while at the same time efficiently ridding the gases to be discharged to atmosphere of fly ash and other particulate noncombustible matter.

Another object of the invention is to provide in an incinerator of the character described, a secondary chamber which is so designed that fly ash and the like may be readily removed therefrom and does not pile up and interfere with the formation of gaseous cyclone bodies in the secondary chamber.

Still another object of the invention is to design an incinerator including a secondary off gas burning chamber having target means against which the off gases and flame are directed to break up the flame and also to assist in the formation of cyclones of intimately intermixed spiraling gases and tongues of flame.

Another object of the invention is to provide a target surface of the character described which cooperates with the off gas inlet to provide a restricted space within the secondary combustion chamber in which thorough intermixing of the flame and off products occurs.

A further object of the present invention is to provide an incinerator unit of durable and reliable design which can be economically manufactured and sold at a price competitive with units presently on the market which do not attempt to combust the off gases of primary combustion.

With the above and other objects in view the present invention consists in the combination and arrangement of elements or their equivalents hereinafter more fully described, illustrated in detail in the accompanying drawings, and more particularly pointed out in the appended claims, it being understood that equivalent changes may be made in the various elements which comprise the invention without departing from the spirit thereof or the scope of the sub-joined claims.

The instant application is a division of application Serial No. 723,470, filed March 24, 1958.

In the drawings:

FIGURE 4 is a front elevational view taken on the line 4—4 of FIGURE 1;

FIGURE 5 is an enlarged, fragmentary, perspective view illustrating the construction of the lower end of the secondary combustion chamber.

FIGURE 6 is a top plan view of another target plate which may be employed to good advantage;

FIGURE 7 is a fragmentary plan view illustrating the ash removal openings in the floor of the secondary combustion chamber;

Figure 1:
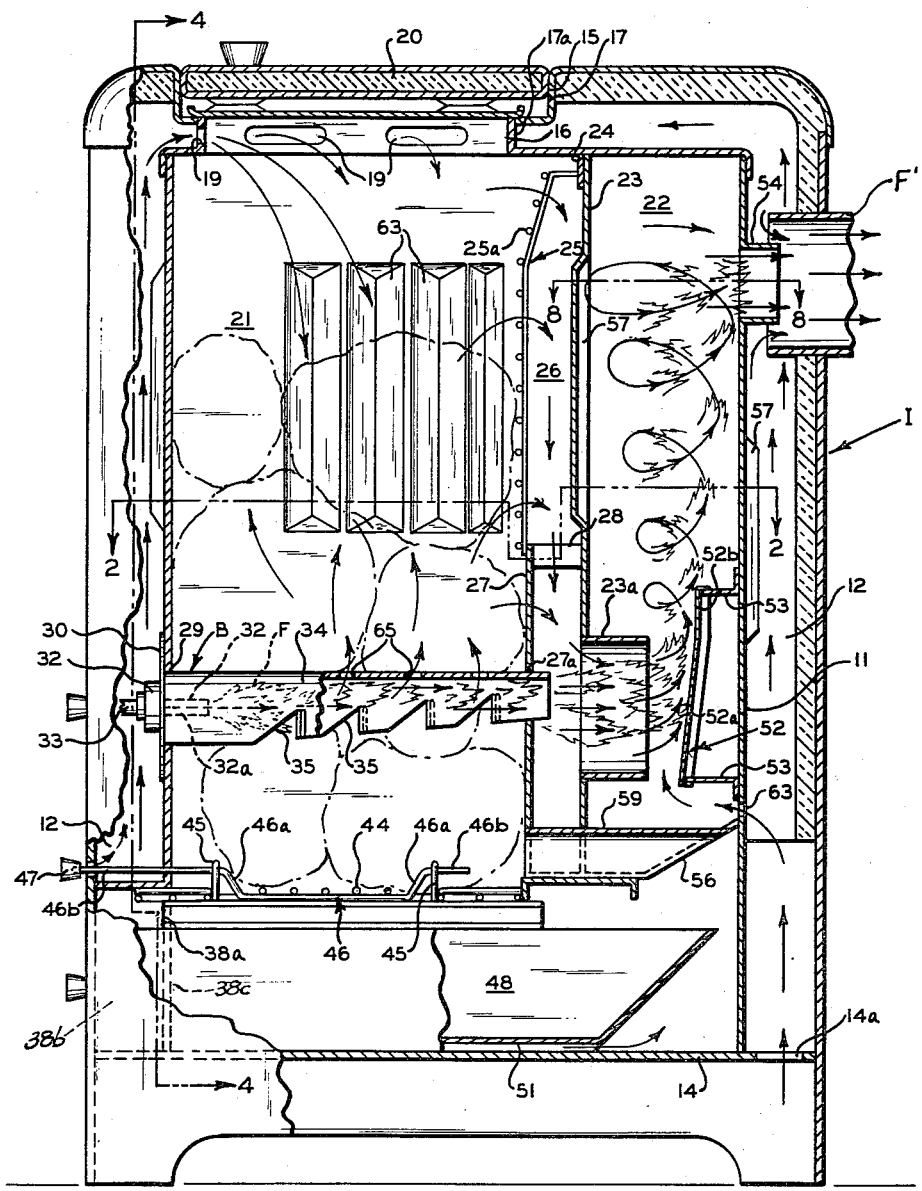
FIGURE 1 is a sectional, side elevational view of our novel incinerator indicating the manner in which the cyclones of flame and whirling off gases are formed in the secondary chamber.

Referring now more particularly to the accompanying drawings in which we have shown a preferred embodiment of the invention only, a letter I indicates an incinerator of downdraft design which includes an insulated outer casing 10, as shown. Mounted within the casing or housing 10 and perimetrally spaced from the side walls and top thereof is an inner casing 11 which defines an air passage 12 between the walls of the inner and outer casings at the front, rear, and sides, as well as at the top. The bottom 14 of the incinerator at the sides and back thereof has openings 14a communicating with the passage 12 which permit air to flow into the passage 12 from outside the incinerator in the usual manner.

Both the inner and outer casings 10 and 11 are provided with top openings 15 and 16, respectively, and a door frame 17, supported in the opening 15, has a throat section 17a extending into the opening 16 in the inner casing admitting air from the passage 12 which flows into the inner casing through openings 19 in the throat section 17a. Mounted to swing outwardly in the same manner as is the charging door in Patent No. 2,696,178 is the insulated charging door 20 through which packages of refuse, trash and garbage may be charged to chamber 18 in the usual manner.

Figure 2:
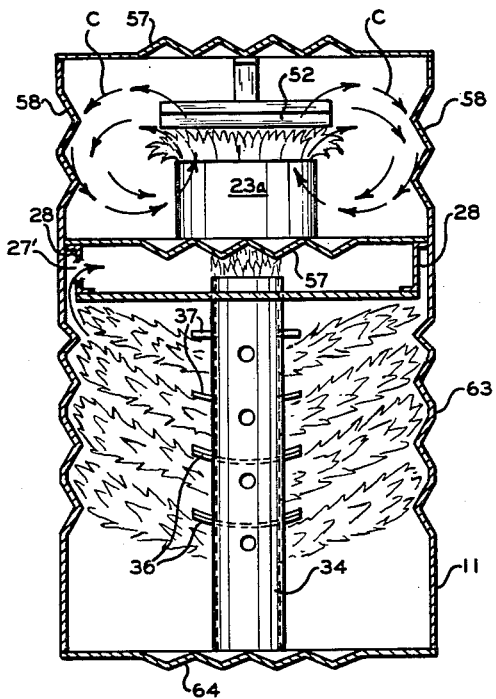
FIGURE 2 is a sectional plan view taken on the line 2—2 of FIGURE 1 with the grate under the primary combustion chamber and the floor of the secondary combustion chamber being omitted in the interests of clarity.
Figure 3:
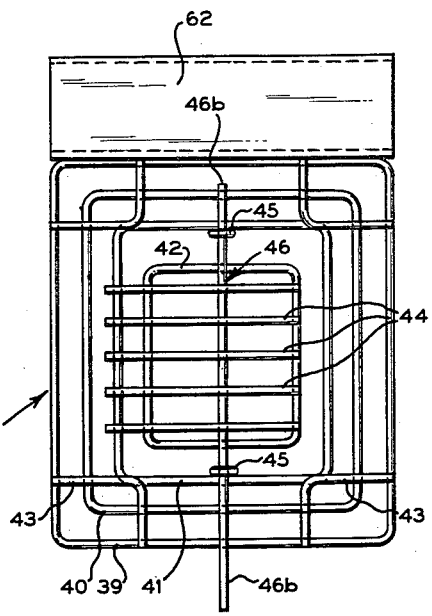
FIGURE 3 is a plan view of the grate only.

Provided within the inner casing 11 and separating the casing 11 into a primary combustion chamber 21 and a secondary combustion chamber 22 is a partition or wall 23 as shown. Hooks 24 mounted at the upper end of the wall 23 support a perforate member or screen 25 which inclines outwardly from wall 23 as at 25a to provide a smoke collection chamber 26 within the primary combustion chamber. The perforate member 25 terminates short of the bottom of chamber 21 and an imperforate bridge wall 27, which is of slightly less width than the interior width of the casing 11 so as to provide slitted entrances 27' (FIGURE 2) for admitting off gases and air to the lower portion of chamber 26 during the initial stages of incineration when the draft is low, is secured to the wall 23 by brackets or straps 28. The imperforate bridge wall has the effect of directing most of the smoke and off gases upwardly to the screen 25 during incineration, whence they can proceed to the lower portion of chamber 26 which, of course, tends to concentrate them prior to charging them through the spout 23a to the secondary combustion chamber 22.

Provided in the front wall of the interior casing 11 is an opening 29 which permits insertion of a burner assembly B which includes a front plate 30 having a peripheral flange which overlies the marginal edge of the opening 29 and can be secured to the inner casing by bolts 31 (FIGURE 4) or in any other suitable manner. A high pressure burner 32 supplied by a gas line 33 is provided for issuing a torch-like flame F which will extend into the secondary chamber 22 through spout 23a and it will be observed that a burner shield 34 of generally semi-cylindrical shape extends from the front plate 31 of the burner assembly through an opening 27a in the bridge wall 27 in line with the spout 23a. The burner 32 has an orifice 32a and ports therein (not shown) disposed in the portion of the burner which extends within the space 12 between the casings 10 and 11 admit primary air to the gaseous fuel mixture in the usual manner. While for the sake of convenience we have shown the burner described, it is to be understood that the burner and also the burner assembly disclosed in the previously mentioned application and incorporated herein by reference can also be employed to good advantage.

Formed in the depending sections of the burner shield 34 are a series of vertically staggered openings 35 which have deflector fins 36 and 37 in like vertically staggered relation disposed in the path of the flame F issuing from the burner orifice 32a to deflect a portion of it laterally to the refuse R which is shown in the primary combustion chamber 21.

The divergent fins 36 extend completely across the lower portion of the shield 34 to, in effect, chop off an under portion of the flame, while fins 37 tend to deflect the outer portions of the flame F laterally. The central or body portion of the flame continues through the burner shield 34 into the secondary chamber 22 as previously noted. Since the openings 35 and fins 36 and 37 are staggered upwardly in a rearward direction, different portions of the flame are, of course, being deflected. Additional air is admitted to the chamber 21 through openings 30a provided in the front plate 30 of the burner assembly.

Inwardly pressed sections provided on the side walls of inner casing 11 support a grate G of novel design which is reciprocable on the supports 38 and includes an outer or main grate portion formed of rectangularly shaped rod members 39, 40 and 41 and an inner grate portion formed by the rectangularly shaped rod member 42. The sections 38 terminate short of the rear wall of the casing 11 and form channels for the admission of the only air (from the side portions of passage 12) to the otherwise closed space 38b under wall 14b through the openings 38a at the front ends of the channels. Walls 38c close off the rear of space 38b which must receive only a limited and controlled supply of air. Angular rod members 43 are welded to members 39, 40 and 41 to secure them in assembled relation and, as will be observed, the inner grate member 42 which is centrally disposed within the outer grate portion has laterally spaced rods 44 welded thereto which extend at one side to overlie the one side of the rectangular rod member 41. Eye portions or bearings 45 which are welded to the ends of member 41 journal a shaft member 46 which is welded to inner member 42 and thence has sections bent upwardly at 46a provided with longitudinally bent ends at 46b which extend through the bearings 45. The front end 46b is of such length as to extend through the casing walls 10 and 11 freely and removably mounted on the outer end thereof is a knob 47. If the knob 47 is pulled forwardly the inner grate section first moves forwardly slightly until the section 46a comes into engagement with the front end of member 41 and thence the entire grate moves forwardly. Likewise when the knob 47 is pushed inwardly the inner section of the grate G has a slight movement rearwardly until section 46a engages the rear end of rod member 41 and the whole grate moves rearwardly.

In this manner the grate is reciprocated to shake ashes into a removable ash drawer 48 provided under the grate and which, for a purpose which will later become apparent, is of sufficient length to extend rearwardly under a portion of the secondary chamber 22. The inner portion of the grate (42, 44) can also be revolved through part of a revolution to dump to the ash drawer 48 below and when revolved through an angle of less than 90°, as will usually be the case, the off-set weight of rods 44 returns the inner portion of the grate to horizontal position and assures that it will remain normally in this position. The grate is designed so that it may be removed out the charging door 20 in a manner which will be later described.

The ash drawer 48 is mounted on the bottom wall 14 of the incinerator and is formed as shown in FIGURE 4 with indented bottom wall portions 51 which admit air from the passages 12 to the rear of the ash drawer for circulation along with the air from openings 38a through the bottom of the grate.

Mounted within the secondary chamber 22 directly opposite the spout 23a admitting the off gases and flame is a target plate 52 supported on the rear wall of the inner casing by angle brackets 53. A portion of the flat face of the target 52 is inclined upwardly as at 52a and the other portion is bent upwardly as at 52b at an angle slightly inclined inward relative to the vertical for a purpose which will now be described in some detail.

In order to reach the spout 23a the off gases and smoke concentrated in the lower portion of chamber 26 must make a 90° turn into the spout 23a through the wall of flame passing from the burner shield 34 toward the target 52 and considerable intermixing of the off gases and flame, of course, occurs at this point, as does some secondary combustion of the gases. Smoke eddies or the like which have not been drawn upwardly in chamber 21 to the screen 25 when the draft is low can pass around the sides of the bridge wall 27 and similarly become intermixed with the off gases. It is also through the slitted openings 27' that excess oxygen or air from chamber 21 seeps to the lower portion of smoke collection chamber 26 to support combustion and to mix with the flame and off gases proceeding toward the target 52. Air proceeding through the passages 38a and 51 in the ash drawer finds its way to the spout 23a in this manner.

The intermixed body of flame, off gases, and air is splattered laterally outwardly by the target 52 which is in the lower portion of chamber 22. In the upper portion of chamber 22 a flue pipe 54 is provided which extends into a main flue F outside the casing and communicates with a suitable chimney to pass the products of secondary combustion to atmosphere and the purpose of this construction will later become apparent. The flue F′, of course, exerts a draft in a vertical direction which tends to draw the products splattering against the target upwardly. For the most part the flame and gases are deflected laterally and upwardly, the laterally deflected mixture tending to take a rotary path so that a pair of oppositely traveling cyclones "c" (FIGURE 2) are formed in the chamber 22 which consist of whirling bodies of intermixed off gases, flame tongues, and air whirling about relatively calm, nonturbulent centers. This cyclone effect may, of course, be enhanced by forming the target plate or surface shown in FIGURE 1 as illustrated in FIGURE 6 with curved side edges 55, however, it has been found that a flat plate which is spaced closely enough to the admission point 23a so that the flame and gases are splattered laterally outwardly also will cause the cyclone bodies to form with the draft exerted substantially normally as shown. The slope 52a of the target 52, of course, assists in the formation of the twin cyclones within the chamber 22. The portion 52b of the target 52 tends to turn the gases and flame back inwardly so that the flame is directed inwardly and gases do not seep out of the top portion of spout 23a without being contacted by portions of the flame deflected upwardly. It is important to note that the space between spout 23a and target 52 is a relatively restricted space which discharges into the relatively large volume of the chamber 22. When the spiraling gases leave the upwardly diverging space between the spout 23 and target 52 they are at once permitted to expand considerably and because they are whirling rather than flowing in a linear path toward the flue 54 during the time of expansion the tongues of flame, which are mixed with the gases and can be seen forming a flame curtain across the mouth of the flue 54, thoroughly consume combustible gases and solid particles in the mixture. The fact that the flame is broken up by the target surface also tends to greatly enhance intermixing and secondary combustion in the relatively restricted space and the entire secondary chamber. Further, fly ash and other noncombustible particulate matter which is entrained in the spiraling gases finds its way to the calm center area of the twin cyclones and settles down to the floor plate 55 of the chamber 22. It is thought that the whirling gases are properly described as cyclones since the eye of the spiraling gases is calm and does not exert any suction force nor have any turbulences which would prevent the fly ash from falling rapidly to the bottom of the combination chamber. Other particles which may be carried in the outer peripheral portion of the whirling gases tend to be scrubbed against the walls of the chamber 22 as the whirling gases progress toward flue 54 and also tend to drop to the floor 56 of the secondary combustion chamber. Noncombustible off gases simply pass off through the curtain of flame to the flue F, of course.

The target 52 is formed of stainless steel so that it shortly becomes incandescent and thus many of the gaseous and particulate combustibles are simply consumed upon contact with the target. Thus, the combustion in the spout 53, at the target 52, and in the whirling cyclones provides a virtually 100% combustion of combustibles in the off gases and the action of the cyclones in ridding the gases of the fly ash and the like also prevents ash and soot from entering the atmosphere and helping create smog conditions.

Provided in the wall 23 and the rear wall of the inner casing 11 are corrugations 57, as shown, which assist in delivering some air to the spiraling gases. Also, similar corrugations 58 are formed in the side walls of the inner casing 11 at points such as to enhance the spiraling action and deliver air to the upper portions of chamber 22.

The floor 55 is formed with a tubular portion 59 which opens to the chamber 21 above the grate G in line with the bearings 45 of the grate, so that if the grate as a whole is moved rearwardly the tubular portion 59, which is open at its bottom end, will accommodate the rear bearing 45. The purpose of this construction will later be made clear. The floor 55 also has a forwardly sloped portion 60 leading to openings 61 which tends to assist the accumulated fly ash and the like falling from the whirling gases to the openings 61 so that they may fall through to the ash drawer 48 therebelow. The fly ash dropping through the vertices of the twin cyclones tends to roll down the wall 59 and wall 60 to openings 61.

During operation of the incinerator the grate is maintained in inward position and carries a plate 62 welded thereto which normally covers openings 61. This cover or plate 62 prevents the entrance of sufficient air at this point parallel to the path of the cyclones which would cause turbulences in the bottom of chamber 22 if the openings 61 were uncovered. Secondary air which it is desired to admit to the combustion chamber 22 is rather provided in a direction tangential to the path of the whirling gases as through openings 63 in the rear wall of the inner casing under the target 52 or through spout 23 admixed with the flame and off gases, so that turbulences which would hamper the formation of the twin cyclones are not created.

The horizontal portion of the floor plate 55 of the secondary combustion chamber is of sufficient length so that the rear bearing 45 of the grate can be moved rearwardly a sufficient distance to permit the front end portion 46b of the plate to clear the front wall of the inner casing 11 when it is desired to remove the grate. Thus, to remove the grate, one first removes the knob 47 on the front end 46b and thence, by reaching in through the charging door 20, pushes the grate rearwardly until the end 46b clears the inner casing. Then it is a simple matter to tilt the grate to avoid the burner shield 34 and draw it upwardly out of the charging opening. It is, of course, sometimes quite important in the repair and maintenance of the incinerator that the grate G be easily removable in this fashion.

The corrugations 63 and 64 in the side walls and front wall of the inner casing, respectively, in the primary combustion chamber provide channels for travel of air for primary combustion and for travel of the flame so that there is a wrap-around of flame relative to the material in the primary chamber 21 being combusted. The recesses of the side wall corrugations 63 are in alignment with the peripheral edges of fins 36 and 37 so that channels are provided for the flames deflected laterally by these fins. (See FIGURE 2.) Additionally, openings 65 provided in the top wall of the burner shield 34 direct flame to any refuse which is above the burner shield.

In operation, during the initial stages of incineration, when portions of the charge are initially drying and odorous fumes are principally being given off, the wrapped garbage and refuse is positioned around the burner shield 34 and, since the path of the flames laterally from the shield is blocked until the flame tongues can burn through, less flame is deflected by the fins 36 and 37 and more of the flame proceeds through to the target 52 to effect the secondary combustion of the off gases and odorous fumes. At this time the draft exerted by the flue 54 is not as strong and some of the odors are drawn through the slits 37′ under brackets 28 into admixture with the flame. When an appreciable amount of the material charged to the chamber 21 is burning, the draft is strong enough so that most of the off gases and smoke are drawn up through the screen 26 which filters out a goodly proportion of the fly ash and, of course, the gases tend to become concentrated in the lower portion of chamber 26. During initial stages of the incineration there is relatively little fly ash to be filtered out. It is during the middle stages of incineration, when much of the material in chamber 21 is burning, that the effect of the cyclonic formations "C" is most evident, because it is at this time that the draft of the flue 54 is strongest.

The provision of the secondary air channels 38 and 51 are important to the incinerator because they deliver a limited and controlled volume of air up through the grate G and through slits 27′. This air is necessary to supply air for drying the material on the grate and secondary air for consuming the material thereon as well as for providing a controlled supply of air to achieve combustion of the off gases. Sufficient air to support the desired secondary combustion in the secondary chamber travels through slits 27′ to the spout 23a and mixes with the off gases proceeding therethrough. The sections 38 effect the dual function of supporting grate G as well as serving as air channels.

Figure 8:
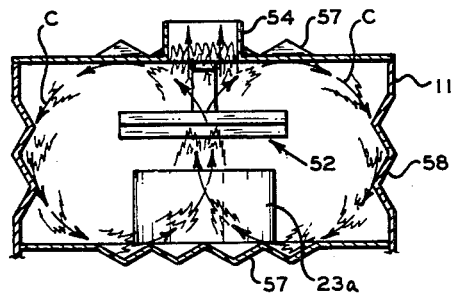
FIGURE 8 is a sectional, plan view on line 8—8 of FIGURE 1.

At the lower end of the secondary chamber the cyclonic bodies are separately formed and do not interfere with one another whereas at the upper end of the chamber adjacent flue section 54 the intermixed flame and gases traveling in opposite directions are of sufficiently increased diameter to come into engagement (FIGURE 8) and considerable turbulence is created which tends to intermingle the cyclonic bodies just before they enter flue section 54. Most of the off gases have been consumed by the time this impingement occurs which results in forming a curtain of flame across the mouth of flue section 54 through which any unconsumed combustibles must pass. The resulting turbulence at the top of the chamber also tends to slow up the flow of gases through the secondary chamber to the flue 54 to provide more time in the cyclonic bodies for combustion to take place. The fact that flue F′ is of greater diameter than flue section 54 and air can enter flue F′ from passage 12 also is a controlling factor tending to decrease the draft force as desired and a conventional barometric damper (not shown) is also provided in flue F′.

The formation of expanding, spiraling cyclone bodies having nonturbulent centers or eyes is to be distinguished from the forcing of gases through a decreasing spiral path which has no calm center. In the latter case there is no concentration of gases at the outset with which broken up tongues of flame can be interspersed and no expansion of the off gases which accomplishes their efficient combustion occurs. Further in the instant case the provision of the calm eyes or centers achieves removal of the fly ash and other noncombustible particulate matter in considerable quantities. With the present construction all of the many results can be accomplished with only the single burner in the primary combustion chamber.

It should be apparent that the instant invention has greatly advanced the art and provided for the first time, to the inventors' knowledge, an incinerator unit which with a single torch-like flame is able to effectively combust virtually one hundred percent of the combustible matter charged to the incinerator.

While for purposes of illustration one form of this invention has been disclosed, other forms thereof may become apparent to those skilled in the art, upon reference to this disclosure, and therefore this invention is not to be limited by the drawings and descriptive material but is to be measured by the scope of the appended claims.

We claim:

1. In a garbage and refuse incinerator; a casing; wall means separating said casing into a primary combustion chamber and a generally vertically disposed, communicating secondary combustion chamber receiving combustion gases from the primary chamber; a generally vertically disposed bridge wall spaced from said wall means at its lower end and spaced from said primary chamber at its upper end to form a combustion gas concentrating chamber between said primary chamber and secondary chamber; burner means in the casing for issuing a flame into the path of the said gases; a removable ash drawer provided under both said primary and secondary chambers; a bottom wall for said secondary chamber having openings therein permitting ash to fall through; grate means in said casing having a reciprocable portion normally covering said openings; and flue means communicating with said secondary chamber.

2. The combination defined in claim 1 in which said bottom wall comprises a vertically sloped portion leading to a generally horizontal portion and said openings are provided in the generally horizontal portion.

3. In a garbage and refuse incinerator; a casing providing a combustion chamber; burner means in said casing; a rearwardly extending, generally horizontal grate supported for reciprocation under said burner means and forming a bottom for the combustion chamber; rearwardly extending means supporting said grate for fore and aft reciprocation; bearing means on said grate with a front-to-rear axis vertically spaced from the plane of the grate; an inner grate supported within said grate in substantially the plane thereof, said inner grate including an actuator rod portion, with generally vertically extending portions fixed to said inner grate, and extending through the bearing means in a different generally horizontal plane from said grate and one of said portions extending out of said casing, said rod, when pivoted in said bearing means, dumping said inner grate and, when reciprocated, reciprocating said grate including the inner grate.

4. The combination defined in claim 3 in which said inner grate is in a front-to-rear direction substantially shorter than the opening provided for it in said grate and when said actuator rod is reciprocated has relative reciprocation with the main grate portion.

5. The combination defined in claim 3 in which members forming part of said inner grate portion extend further on one side of the axis of said bearing means than on the other to overlie the side of the main grate portion so that the offset weight of the inner grate portion tends to maintain it in horizontal alignment with the main grate portion.

6. The combination defined in claim 3 in which a secondary chamber is provided in said casing having a floor with an arched tubular portion, said bearing means comprises eye-like bearings on said grate for said inner grate portion to accommodate said actuator rod portions; said arched portion receiving said eye-like bearings when the grate is pushed in one direction to permit removal of the grate from within the casing.

7. In an incinerator for combusting refuse, garbage, and the like; a casing including wall means separating said casing into a primary combustion chamber and a generally vertically disposed secondary combustion chamber within said casing rearward of the primary chamber; a burner means assembly within the said primary combustion chamber extending longitudinally rearwardly toward the lower portion of the secondary chamber generally centrally relative to the sides of the casing; a generally vertically disposed bridge wall, having a generally central opening admitting said burner means assembly and providing a generally central passage therefor, spaced forwardly from said wall means at its lower end and open to said primary combustion chamber near its upper end to form a combustion gas concentrating collection chamber in said primary combustion chamber between said bridge wall and a portion of said wall means forming the front of the secondary combustion chamber, said bridge wall, except for said central opening, being substantially imperforate and having relatively narrow, open portions at its side edges only at points remote from said central opening which communicate said primary chamber with said gas concentrating collection chamber; grate means in the primary chamber adjacent said burner means assembly for supporting refuse, garbage, and the like adjacent the burner means assembly, the lower section of said secondary chamber being only open to said gas concentrating collection chamber generally centrally thereof opposite the generally central opening in the bridge wall; the off gases taking the path to the said open portions at the sides of said bridge wall and around behind said bridge wall to the generally central opening in the secondary combustion chamber to reach the secondary chamber; and flue means connected with said secondary chamber near the upper end thereof and leading away therefrom out of said casing.

References Cited in the file of this patent

UNITED STATES PATENTS

| | | |
|---|---|---|
| 1,218,325 | Shannon | Mar. 6, 1917 |
| 1,503,767 | Rezsny | Aug. 5, 1924 |
| 1,715,954 | Schuetz | June 4, 1929 |
| 1,724,575 | Graver | Aug. 13, 1929 |
| 1,769,880 | Howle | July 1, 1930 |
| 1,986,201 | Huff | Jan. 1, 1935 |
| 2,014,287 | Newman | Sept. 10, 1935 |
| 2,482,215 | Russell | Sept. 20, 1949 |
| 2,739,547 | Triggs | Mar. 27, 1956 |
| 2,747,526 | Seidl | May 29, 1956 |
| 2,790,401 | Hebert | Apr. 30, 1957 |
| 2,845,882 | Bratton | Aug. 5, 1958 |
| 2,847,951 | Trigg | Aug. 19, 1958 |
| 2,859,716 | Slaughter | Nov. 11, 1958 |
| 2,905,115 | Kendall | Sept. 22, 1959 |
| 2,929,342 | Young | Mar. 22, 1960 |

FOREIGN PATENTS

| | | |
|---|---|---|
| 37,229 | Denmark | Mar. 2, 1927 |
| 524,336 | Great Britain | Aug. 5, 1940 |